(No Model.)
J. B. McCUNE.
FLY WHEEL AND PULLEY FOR SEWING MACHINES.
No. 268,703. Patented Dec. 5, 1882.
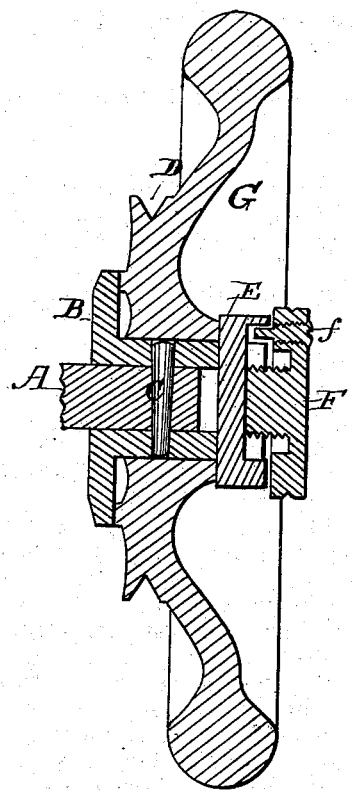
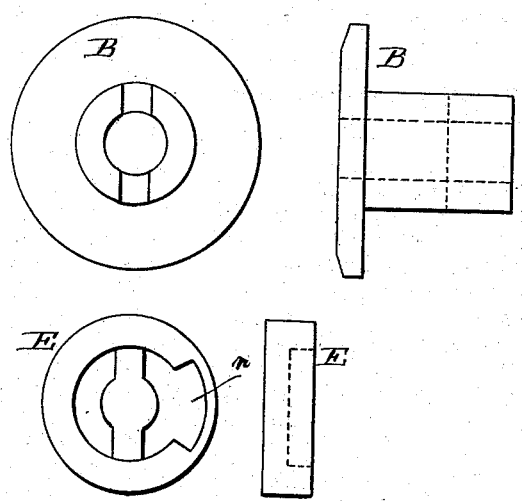
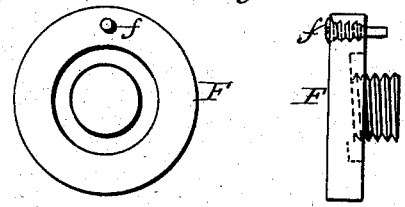
Witnesses:
E. E. Masson
Wm. H. Bates.
Inventor.
Joseph B. McCune,
H. C. Woodward,
Attorney.

United States Patent Office.

JOSEPH B. McCUNE, OF HARTFORD, CONNECTICUT, ASSIGNOR TO ELIAS A. WILKINSON, OF NEWARK, NEW JERSEY.

FLY-WHEEL AND PULLEY FOR SEWING-MACHINES.

SPECIFICATION forming part of Letters Patent No. 268,703, dated December 5, 1882.

Application filed June 20, 1882. (No model.)

*To all whom it may concern:*

Be it known that I, JOSEPH B. McCUNE, of Hartford, Connecticut, have invented certain new and useful Improvements in Fly-Wheels and Pulleys for Sewing-Machines, described in this specification and the drawings thereof.

The invention consists in improvements relating to the fly-wheel and pulley for the purpose of stopping and starting the sewing mechanism without stopping the movement of the treadle.

Figure 1 is a vertical section of one form of the improvement. Figs. 2 and 3 are detail views of parts of the same.

In the form of construction shown the flanged sleeve B is fastened to the main shaft A by a pin, C. The fly-wheel G, having pulley D, is loose on the flanged sleeve, and held in place by the washer E, having limiting-recess $n$, and on the flanged sleeve, and the clamping-screw F in the end of the flanged sleeve, and having a limiting-pin, $f$, to enter the limiting-recess. The fly-wheel having pulley is made fast or loose by turning the clamping-screw up or back, respectively, and the clamping-screw is limited in its movement, so as not to be turned up too tight or turned off by the limiting-recess and the limiting-screw. The fly-wheel having pulley can be made loose by a slight turn of the clamping-screw when the machine of which it is a part is in operation, and the movement of the needle can thereby be suddenly stopped without stopping the driving mechanism, and the contrary.

The details of construction and operation may be varied within the scope of my improvement.

I claim as my invention—

1. The combination of fly-wheel G, having pulley D, flanged sleeve B, main shaft A, washer E, having limiting-recess $n$, and clamping-screw F, having limiting-pin $f$, substantially as set forth.

2. The combination, with a main shaft, of a flanged sleeve secured thereto, a fly-wheel having a pulley loose on the flanged sleeve, a washer on the flanged sleeve, and a clamping-screw limited in its movement both ways, substantially as set forth.

3. The combination, in sewing mechanism, of a driving-shaft, a fly-wheel, and pulley loose on the shaft, and a clamping screw or nut limited in movement, substantially as set forth.

In testimony whereof I hereunto subscribe my signature, in the presence of two attesting witnesses, on the 31st day of May, 1882.

JOSEPH B. McCUNE.

Witnesses:
M. PARPART,
OTTO E. FIGGE.